United States Patent
Park et al.

(10) Patent No.: US 11,453,358 B2
(45) Date of Patent: Sep. 27, 2022

(54) DRIVER AIR BAG APPARATUS FOR VEHICLE WITH ILLUMINATION EMBLEM

(71) Applicant: HYUNDAI MOBIS CO., LTD., Seoul (KR)

(72) Inventors: Hae Kwon Park, Yongin-si (KP); Seok Hoon Ko, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/242,237

(22) Filed: Apr. 27, 2021

(65) Prior Publication Data

US 2021/0362668 A1 Nov. 25, 2021

(30) Foreign Application Priority Data

May 21, 2020 (KR) .......................... 10-2020-0061022

(51) Int. Cl.
*B60R 21/2165* (2011.01)
*B60R 21/215* (2011.01)

(52) U.S. Cl.
CPC .................. *B60R 21/2165* (2013.01); *B60R 2021/21543* (2013.01)

(58) Field of Classification Search
CPC .... B60R 21/21656; B60R 2021/21537; B60R 2021/21543
See application file for complete search history.

(56) References Cited

U.S. PATENT DOCUMENTS

| 5,678,851 | A  | * | 10/1997 | Saito ................... | B60R 13/0206 280/731 |
| 6,099,027 | A  | * | 8/2000  | Shirk .................... | B60R 13/005 280/731 |
| 6,247,724 | B1 | * | 6/2001  | Jambor ............. | B60R 21/21656 74/552 |
| 2001/0040362 | A1 | * | 11/2001 | Ellerbrok .......... | B60R 21/21656 280/743.2 |
| 2002/0084634 | A1 | * | 7/2002  | Adomeit ............. | B60R 21/2037 280/731 |
| 2007/0126216 | A1 | * | 6/2007  | Nakamura ............... | B60Q 3/14 280/731 |
| 2008/0090031 | A1 | * | 4/2008  | Hirzmann ......... | B60R 21/21656 428/31 |
| 2009/0273165 | A1 | * | 11/2009 | Worrell ............. | B60R 21/21656 280/728.3 |

(Continued)

FOREIGN PATENT DOCUMENTS

| JP | 08301044 | A | * | 11/1996 | ........... B60R 21/216 |
| JP | 10236259 | A | * | 9/1998  | |

(Continued)

*Primary Examiner* — Barry Gooden, Jr.
(74) *Attorney, Agent, or Firm* — DLA Piper LLP (US)

(57) ABSTRACT

A driver airbag apparatus for vehicle with an illumination emblem, capable of preventing the deployment pressure of an airbag cushion 10 from being directly transmitted to a cover hinge part 43 of an airbag cover 40, thereby preventing the cover hinge part 43 from being broken due to the deployment pressure of the airbag cushion 10 and the departure of the illumination emblem 50 from a driver airbag module, by using a guide support 60 installed to cover the cover hinge part 43 of the airbag cover 40 at an inner position of the illumination emblem 50.

9 Claims, 8 Drawing Sheets

(56) References Cited

U.S. PATENT DOCUMENTS

| | | | | |
|---|---|---|---|---|
| 2009/0315306 A1* | 12/2009 | Worrell | ................... | B60Q 5/003 |
| | | | | 74/484 H |
| 2010/0102538 A1* | 4/2010 | Paxton | ................... | B60Q 3/283 |
| | | | | 428/31 |
| 2010/0104780 A1* | 4/2010 | Paxton | ................... | B60R 21/215 |
| | | | | 156/60 |
| 2010/0123300 A1* | 5/2010 | Helmstetter | ........... | B60Q 3/283 |
| | | | | 280/731 |
| 2010/0194080 A1* | 8/2010 | Paxton | .............. | B60R 21/21656 |
| | | | | 280/728.3 |
| 2011/0109066 A1* | 5/2011 | Rick | ................. | B60R 21/21656 |
| | | | | 280/728.3 |
| 2011/0116251 A1* | 5/2011 | Rick | ........................ | B60Q 3/68 |
| | | | | 280/731 |
| 2014/0210190 A1* | 7/2014 | Bosch | ................... | B60R 21/203 |
| | | | | 280/728.3 |
| 2014/0210191 A1* | 7/2014 | Bosch | ................... | B60R 21/203 |
| | | | | 280/728.3 |
| 2016/0272143 A1* | 9/2016 | Hellot | ................... | B60R 21/215 |
| 2020/0406848 A1* | 12/2020 | Kang | ................... | B60R 21/203 |
| 2021/0061189 A1 | 3/2021 | Fujimori | ............... | B60R 13/005 |
| 2022/0063518 A1* | 3/2022 | Kim | ....................... | B60Q 3/283 |
| 2022/0080919 A1* | 3/2022 | Ko | ........................... | B60Q 3/80 |

FOREIGN PATENT DOCUMENTS

| | | | | |
|---|---|---|---|---|
| JP | 2001328501 A | * | 11/2001 | ........... B60R 21/203 |
| JP | 2007022448 A | * | 2/2007 | ............ B60Q 5/003 |
| JP | 2011134647 A | * | 7/2011 | ............ B60Q 5/003 |
| KR | 2012-0044831 | | 5/2012 | |

\* cited by examiner

DRIVER AIR BAG APPARATUS FOR VEHICLE WITH ILLUMINATION EMBLEM

CROSS-REFERENCE TO RELATED APPLICATION

This application claims priority from Korean Patent Application No. 10-2020-0061022, filed on May 21, 2020, in the Korean Intellectual Property Office, the disclosure of which is incorporated herein by reference in its entirety.

BACKGROUND OF THE INVENTION

Field of the Invention

The present invention relates to a driver airbag apparatus for vehicle with an illumination emblem, and more particularly, to a technology directed to a driver airbag apparatus for vehicle with an illumination emblem capable of preventing the departure of the illumination emblem from a driver airbag module by preventing a cover hinge part from being damaged due to the deployment pressure of an airbag cushion in the airbag cover coupled to the illumination emblem.

Description of the Related Art

As a measure to protect the safety of vehicle occupants, various types of airbag apparatuses are provided in the vehicle, and among them, a driver airbag apparatus is mounted on a steering wheel.

The driver airbag apparatus receives a control signal from an airbag control unit, and when an inflator explodes, an airbag cushion protrudes from a steering wheel and is deployed toward a driver by the pressure of the airbag gas injected from the inflator. Accordingly, it is configured to protect the driver's upper body with the deployed airbag cushion.

On the other hand, when an illumination emblem is installed together with a driver airbag apparatus, the illumination emblem is installed to be connected to an airbag cover on which a tear line is formed. Thus, the airbag cover is damaged by the deployment pressure of the airbag cushion and separated from an airbag module, and the illumination emblem is also separated. Accordingly, there is a disadvantage in that the injury of the passenger (driver) is increased due to the illumination emblem separated from the airbag module.

The matters described as the background art are only for enhancing an understanding of the background of the present invention, and should not be taken as acknowledging that they correspond to the prior art already known to those of ordinary skill in the art.

SUMMARY OF THE INVENTION

The present invention is a configuration in which a guide support for covering a cover hinge part of an airbag cover is installed in a driver airbag apparatus for vehicle in which an illumination emblem is coupled with the airbag cover. The purpose of the present invention is to prevent the cover hinge part from being damaged by the deployment pressure of the airbag cushion by preventing the deployment pressure of the airbag cushion from directly transmitted to the cover hinge part by the guide support, thereby preventing the departure of the illumination emblem from a driver airbag module so that injuries to passengers (drivers) due to the illumination emblem can be prevented as much as possible.

In order to achieve the purpose above, the driver airbag apparatus for vehicle with an illumination emblem includes an airbag housing in which an airbag cushion and an inflator are installed; an airbag cover which is coupled to the airbag housing, and includes a cover hole formed in a center thereof, a tear line formed in a circumferential direction around the cover hole, and a cover hinge part formed between both ends of the tear line; an illumination emblem which is coupled to the airbag cover to be exposed through the cover hole; and a guide support which is installed to cover the cover hinge part at an inner position of the illumination emblem and guides a deployment of the airbag cushion to prevent the airbag cushion from being deployed to the cover hinge part.

The guide support is formed of either plastic or steel.

A width of the guide support in left and right directions is formed larger than a width of the cover hinge part in left and right directions, and smaller than a diameter of the airbag cover.

The apparatus further includes a cushion cover which covers the folded airbag cushion so as to maintain the folded state of the airbag cushion, and the guide support is installed to cover the cover hinge part by being coupled to the cushion cover.

The guide support is inserted into the cushion cover and is coupled to the cushion cover by sewing.

A pocket is formed in a portion of the cushion cover that can cover the cover hinge part; and the guide support is inserted into the pocket of the cushion cover and is coupled to the cushion cover by sewing.

The guide support is coupled to the cushion cover in a form that is attached on one side of the cushion cover.

The guide support is coupled to one side of the cushion cover through an adhesive member.

The guide support is installed so that one side is coupled to an inner surface of a wall part of the airbag cover through an adhesive member and the other side is supported on a bottom surface of the illumination emblem to cover the cover hinge part.

The guide support is installed so that one side is coupled to a bottom surface of the illumination emblem through an adhesive member and the other side is supported on an inner surface of a wall part of the airbag cover to cover the cover hinge part.

BRIEF DESCRIPTION OF THE DRAWINGS

FIGS. 4(A)-4(D) are views for explaining a coupling embodiment of a cushion cover and a guide support.

DETAILED DESCRIPTION OF THE PREFERRED EMBODIMENTS

Specific structural or functional descriptions of the embodiments of the present invention disclosed in this specification or application are exemplified only for the purpose of describing the embodiments according to the present invention, and the embodiments according to the present invention may be implemented in various forms and should not be construed as being limited to the embodiments described in this specification or application.

Since the embodiments according to the present invention can be modified in various ways and have various forms, specific embodiments are illustrated in the drawings and will be described in detail in the present specification or application. However, this is not intended to limit the embodiments according to the concept of the present invention to a specific form of disclosure, and it should be understood to include all changes, equivalents, and substitutes included in the spirit and scope of the present invention.

Terms such as first and second may be used to describe various components, but the components should not be limited by the terms. The above terms are only for the purpose of distinguishing one component from other components, for example, without departing from the scope of the rights according to the concept of the present invention, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present invention. Singular expressions include plural expressions unless the context clearly indicates otherwise. In the present specification, terms such as "comprise" or "have" are intended to designate the existence of a specified feature, number, step, action, component, part, or combination thereof, and are understood that the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present invention belongs. Terms such as those defined in commonly used dictionaries should be interpreted as having meanings consistent with the meanings of the related technology, and should not be interpreted as ideal or excessively formal meanings unless explicitly defined in the present specification.

A control unit (controller) according to an exemplary embodiment of the present invention may be implemented through an algorithm configured to control the operation of various components of a vehicle or a nonvolatile memory (not shown) configured to store data related to a software command for reproducing the algorithm, and a processor (not shown) configured to perform an operation described below using data stored in the corresponding memory. Here, the memory and the processor may be implemented as separate chips. Alternatively, the memory and processor may be implemented as a single chip integrated with each other. The processor may take the form of one or more processors.

Hereinafter, a driver airbag apparatus for vehicle with an illumination emblem according to a preferred embodiment of the present invention will be described with reference to the accompanying drawings.

The driver airbag apparatus for vehicle equipped with an illumination emblem according to the present invention includes, as shown in FIGS. 1 to 8, an airbag cushion 10, an inflator 20, an airbag housing 30, an airbag cover 40, an illumination emblem 50, and a guide support 60.

Figure 1:
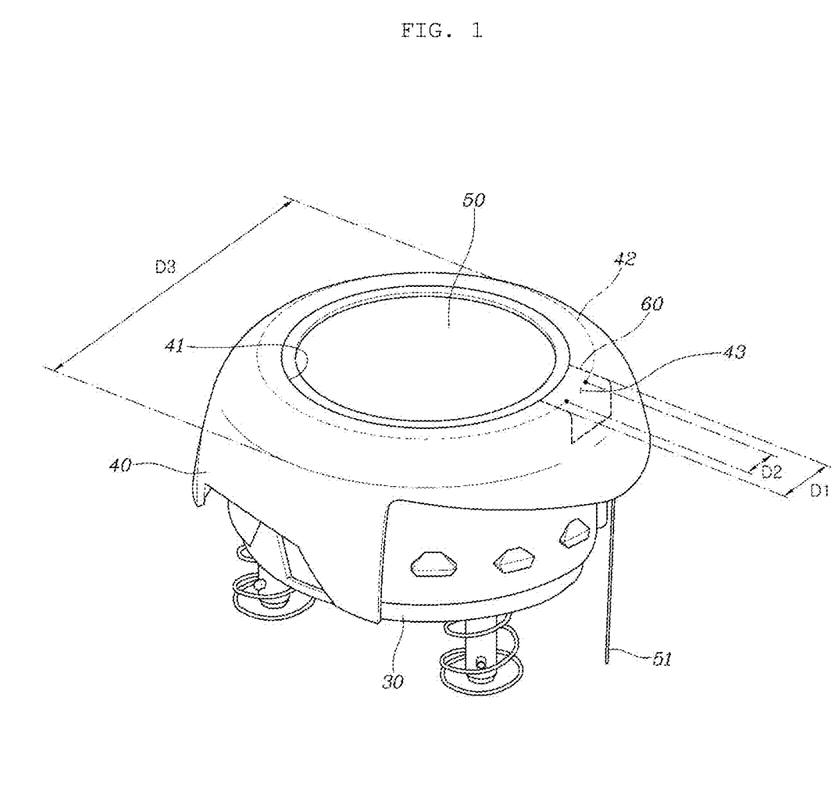
FIG. 1 is a perspective view of a driver airbag apparatus for vehicle equipped with an illumination emblem according to the present invention.
Figure 2:
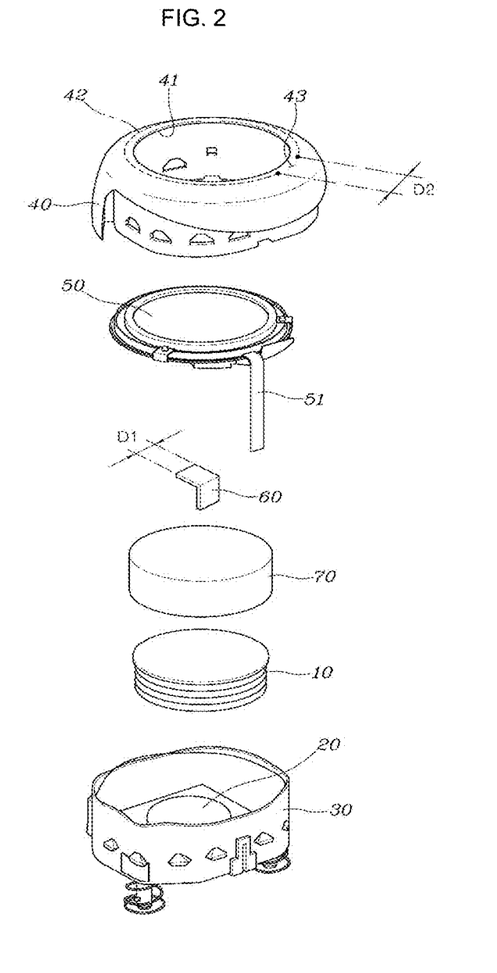
FIG. 2 is an exploded perspective view of FIG. 1.

The airbag housing 30 is fixedly mounted on a hub of a steering wheel of a vehicle, the inflator 20 is fixedly installed on a bottom surface of the airbag housing 30, and the airbag cushion 10 is installed in a folded state and accommodated in the airbag housing 30.

The airbag cushion 10 is deployed toward a driver by the pressure of the airbag gas generated during the explosion of the inflator 20 to protect the driver.

The airbag cover 40 is coupled with the airbag housing 30 to cover the airbag housing 30, and a cover hole 41 of a predetermined size is formed in a circular shape at a center portion, a tear line 42 is formed along the circumferential direction around the cover hole 41, and a cover hinge part 43 is formed between both ends of the tear line 42.

The tear line 42 is a line torn by the deployment pressure of the airbag cushion 10, and the airbag cushion 10 is protruded and deployed toward the driver through the torn tear line 42.

When the airbag cover 40 is torn along the tear line 42 as the airbag cover 40 is damaged by the deployment pressure of the airbag cushion 10, the pieces of the torn airbag cover 40 should not be completely separated from the airbag cover 40, and, for this purpose, the portion between the ends of the tear line 42 becomes the cover hinge part 43.

The cover hinge part 43 is a section between both ends of the tear line 42 in which the tear line 42 is not formed along the longitudinal direction of the tear line 42. When the airbag cushion 10 is deployed, the cover hinge part 43 is kept connected to the airbag cover 40 continuously, and the pieces of the airbag cover 40 torn through this are not completely separated from the airbag cover 40, thereby preventing the driver's injury caused by scattering the airbag cover 40.

Typically, the assembly of the airbag cushion 10, the inflator 20, the airbag housing 30, and the airbag cover 40 may be referred to as a driver airbag module.

The illumination emblem 50 is coupled to the airbag cover 40 so as to be exposed to an outside through the cover hole 41.

The illumination emblem 50 typically includes a light source (LED), a printed circuit board (PCB), a film on which an emblem such as a logo or a sentence is expressed, a transparent cover, a bezel, etc., and a power line 51 is connected to the PCB for connection of external power.

An embodiment according to the present invention includes the guide support 60 installed to cover the cover hinge part 43 at an inner position of the illumination emblem 50.

The guide support 60 serves to guide the deployment direction of the airbag cushion 10 so as to prevent the deployment pressure of the airbag cushion 10 from being transmitted to the cover hinge part 43. Through this, it can prevent the cover hinge part 43 from being damaged by the deployment pressure of the airbag cushion 10.

Figure 6:
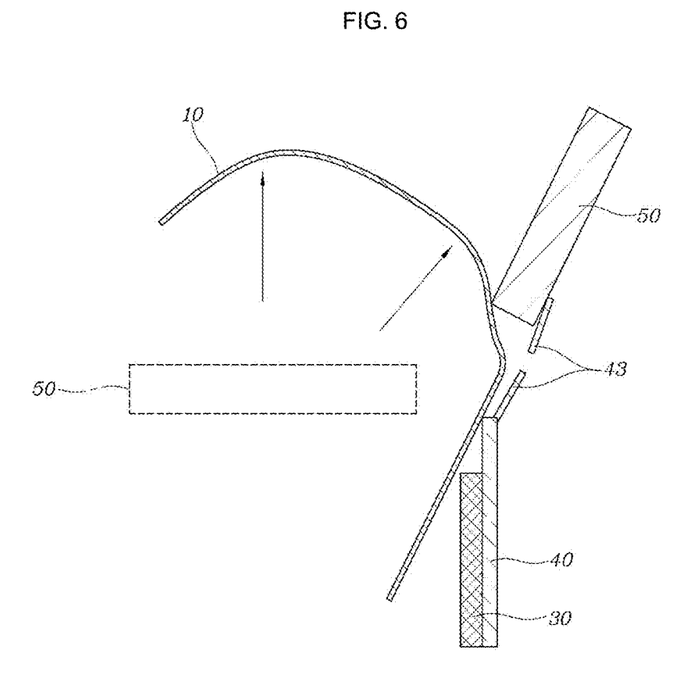
FIG. 6 is a view for explaining a conventional structure to which a guide support is not applied.

In the case of a conventional structure without a guide support as shown in FIG. 6, as the deployment pressure of the airbag cushion 10 is directly transmitted to the cover hinge part 43 of the airbag cover 40 through the illumination emblem 50, the cover hinge part 43 is not able to withstand the deployment pressure of the airbag cushion 10 and is frequently broken. When the cover hinge part 43 is broken, the heavy illumination emblem 50 is separated from the airbag module, and scattered toward the driver. Thus, there is a problem that the driver's injuries caused by the illumination emblem 50 are aggravated.

Figure 5:
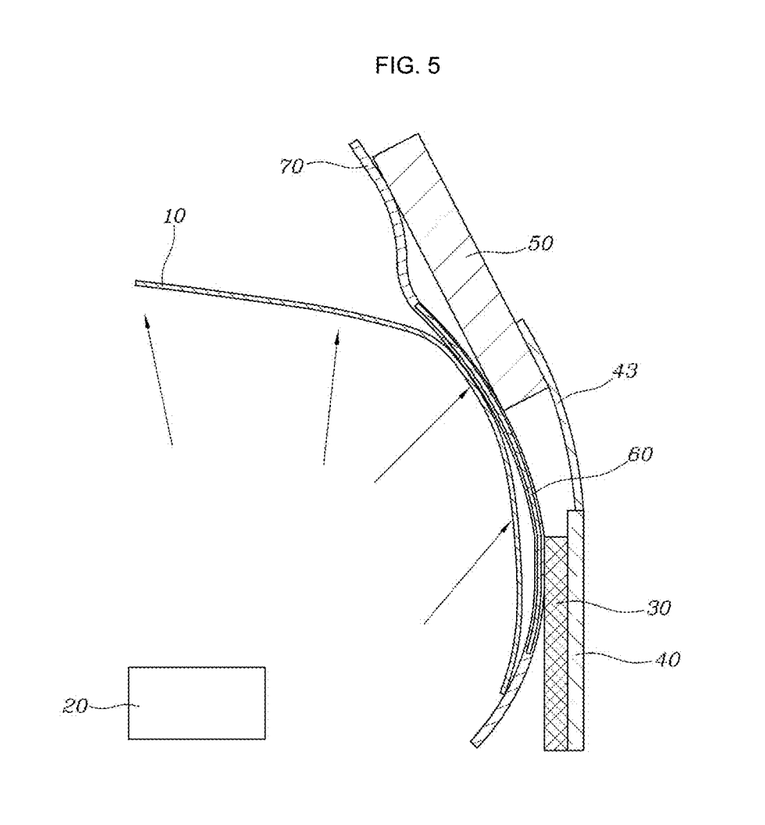
FIG. 5 is a view of an airbag cushion deployed in a state in which a guide support is applied according to the present invention.

However, if the guide support 60 is installed to cover the cover hinge part 43 at the inner position of the illumination emblem 50 as in the present invention, the airbag cushion 10 deployed as shown in FIG. 5 is guided in the deployment direction by the support of the guide support 60, thereby preventing the deployment pressure of the airbag cushion 10 from being directly transmitted to the cover hinge part 43 of the airbag cover 40. Accordingly, it is possible to prevent the breakage of the cover hinge part 43 due to the deployment pressure of the airbag cushion 10, thereby preventing the departure of the illumination emblem 50 from the driver airbag module. As a result, it has the advantage of preventing injuries to the driver as much as possible.

The guide support 60 according to the present invention preferably has a strength (stiffness) that does not cause damages or breakage due to the deployment pressure of the airbag cushion 10, and for this purpose, it is preferably formed of any one of a reinforced plastic and a steel having a predetermined strength, but is not limited thereto.

Figure 3:
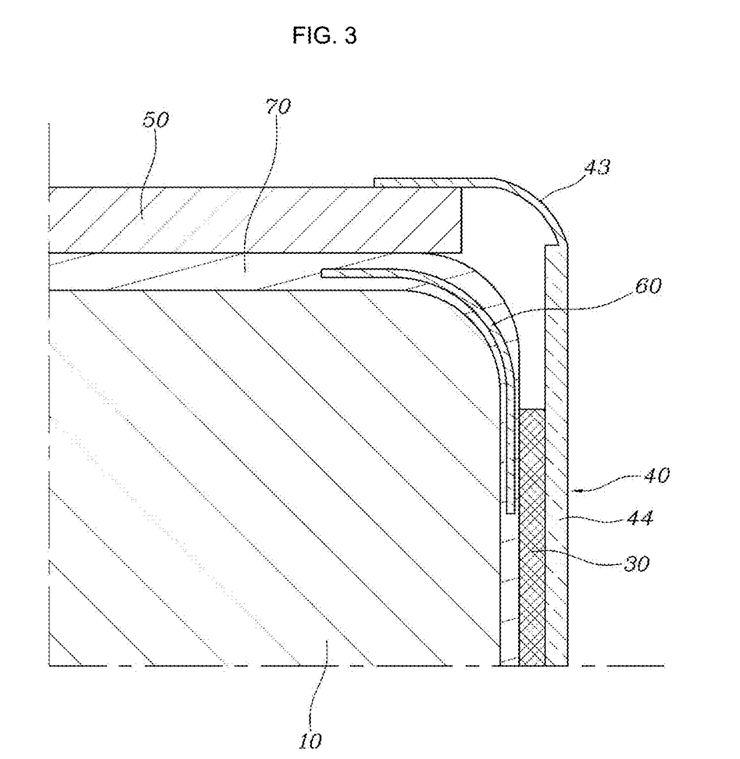
FIG. 3 is a view of an embodiment in which a guide support is coupled to a cushion cover according to the present invention.

The guide support 60 should be formed in a size that can sufficiently cover the cover hinge part 43 of the airbag cover 40, and for this purpose, the width D1 in the left and right directions of the guide support 60 is preferably formed larger than the width D2 in the left and right directions of the cover hinge part 43.

In addition, for appearance, the guide support 60 should not be exposed to the outside of the airbag cover 40, and for this purpose, the width D1 in the left and right direction of the guide support 60 is preferably formed smaller than the diameter D3 of the airbag cover 40.

The embodiment according to the present invention further includes a cushion cover 70 that covers the folded airbag cushion 10 to maintain the folded state of the airbag cushion 10, and the guide support 60 may be a structure installed to be coupled to the cushion cover 70 and cover the cover hinge part 43.

The cushion cover 70 may be formed of a fabric having a flexible property.

Figure 4A:
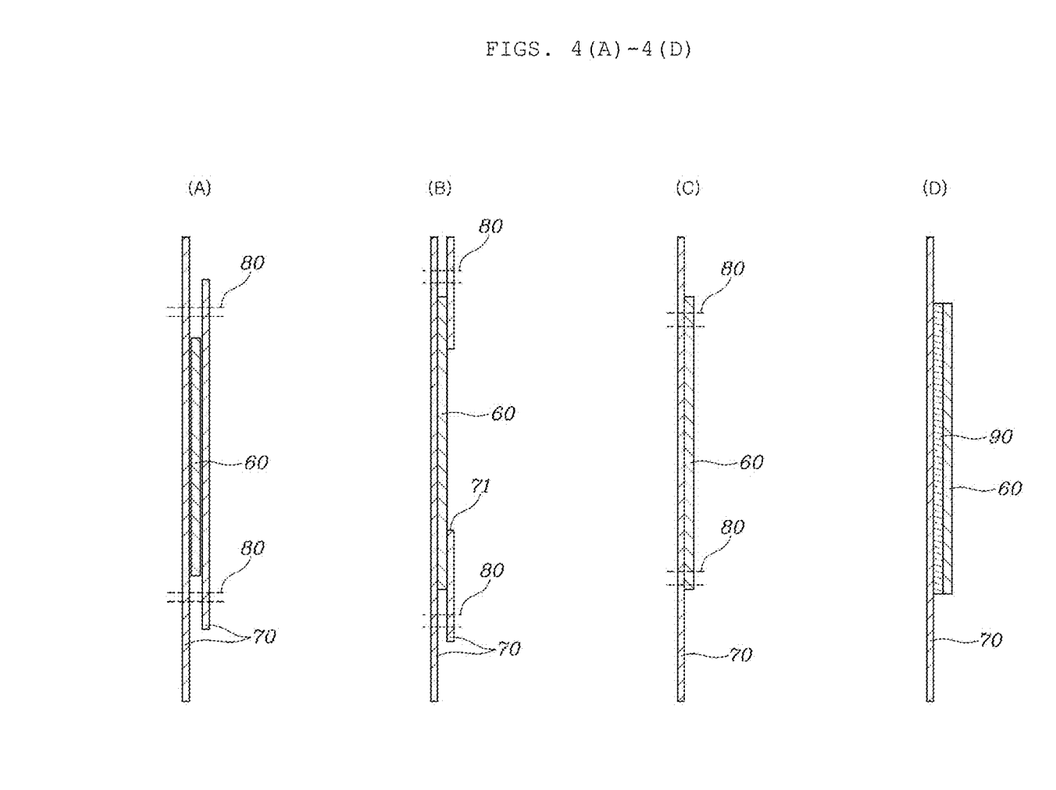

FIGS. 4(A)-4(D) show various embodiments of the coupling structure of the guide support 60 and the cushion cover 70. FIG. 4(A) shows a structure in which the guide support 60 is inserted into the cushion cover 70, and coupled to the cushion cover 70 by sewing 80. FIG. 4(B) shows a structure in which a pocket 71 is formed in a portion that can cover the cover hinge part 43 in the cushion cover 70, and the guide support 60 is inserted into the pocket 71 of the cushion cover 70 and coupled to the cushion cover 70 by the sewing 80. FIG. 4(C) shows a structure in which a guide support 60 is attached to one side of the cushion cover 70 and coupled to the cushion cover 70 by the sewing 80. FIG. 4(D) shows a structure in which the guide support 60 is coupled to one side of the cushion cover 70 through an adhesive member 90.

The adhesive member 90 may include a bond, double-sided tape, or the like.

Figure 7:
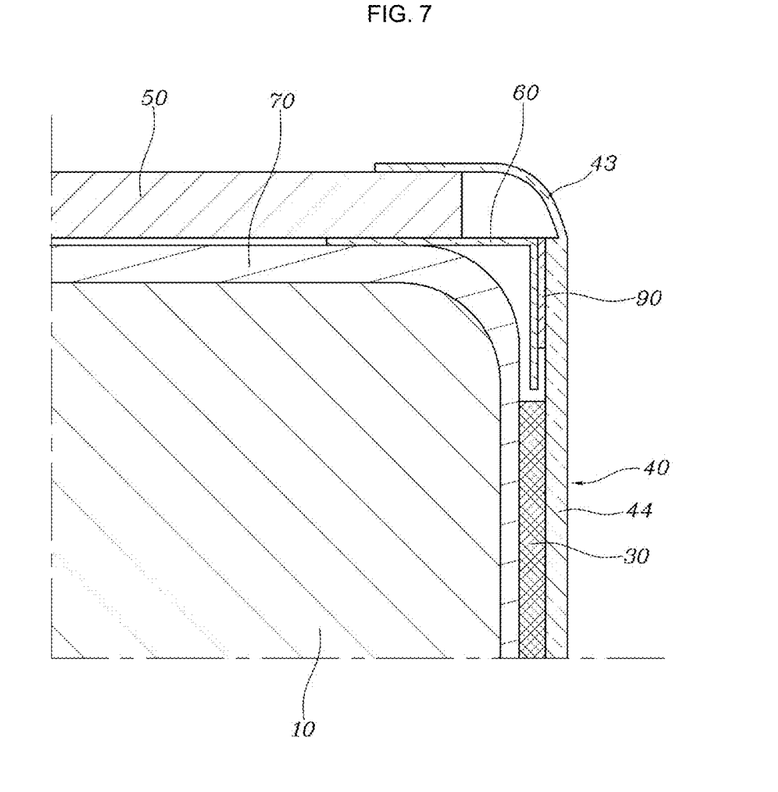
FIGS. 7 to 8 are views for explaining other coupling embodiments of the guide support according to the present invention.

FIG. 7 shows another embodiment of the installation structure of the guide support 60. In a state in which the guide support 60 is positioned in the inside of the illumination emblem 50, one side of the guide support 60 is coupled to the inner surface of a wall part 44 of the airbag cover 40 through the adhesive member 90, and the other side of the guide support 60 is supported on the bottom surface of the illumination emblem 50 to cover the cover hinge part 43.

Figure 8:
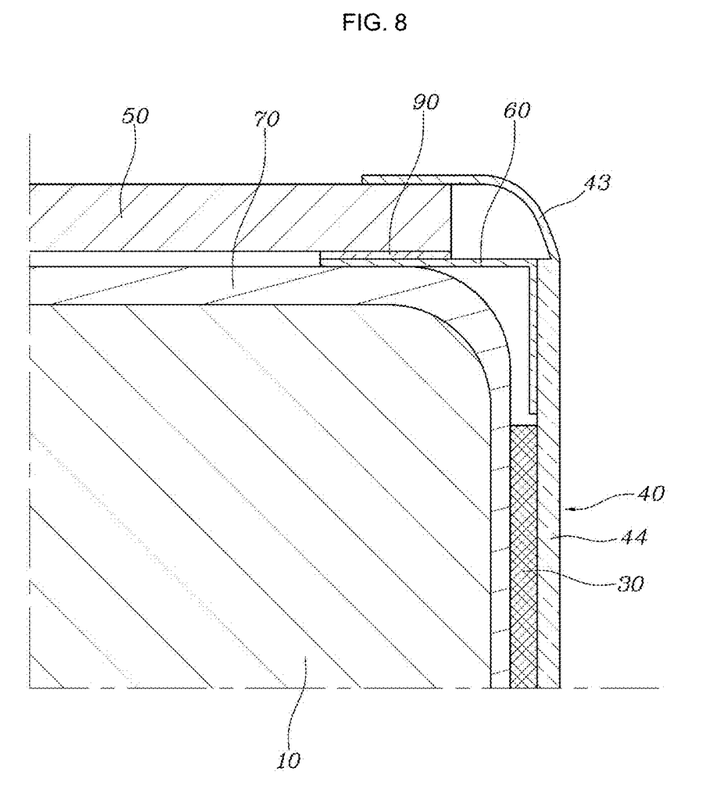

In addition, FIG. 8 shows other embodiment of the installation structure of the guide support 60. In a state in which the guide support 60 is positioned in the inside of the illumination emblem 50, one side of the guide support 60 is coupled to the bottom surface of the illumination emblem 50 through the adhesive member 90, and the other side of the guide support 60 is supported on the inner surface of the wall part 41 of the airbag cover 40 to cover the cover hinge part 43.

As described above, the driver airbag apparatus for vehicle with the illumination emblem according to the present invention is a configuration in which the guide support 60 is provided to cover the cover hinge part 43 of the airbag cover 40 at the inner position of the illumination emblem 50. With the configuration, the airbag cushion 10 is guided in the deployment direction by the support of the guide support 60, thereby preventing the deployment pressure of the airbag cushion 10 from being directly transmitted to the cover hinge part 43 of the airbag cover 40. Thus, it is possible to prevent the breakage of the cover hinge part 43 due to the deployment pressure of the airbag cushion 10, thereby preventing the departure of the illumination emblem 50 from the driver airbag module. As a result, there is an advantage of preventing the injury to the driver due to the illumination emblem 50 as much as possible.

The driver airbag apparatus for vehicle with an illumination emblem according to the present invention is configured with a guide support installed to cover a cover hinge part of an airbag cover at an inner position of the illumination emblem. The airbag cushion is guided in the deployment direction by the support of the guide support. Accordingly, the deployment pressure of the airbag cushion is prevented from being directly transmitted to the cover hinge part of the airbag cover, thereby preventing the breakage of the cover hinge part due to the deployment pressure of the airbag cushion, and preventing the departure of the illumination emblem from a driver airbag module. As a result, there is an effect of preventing the driver's injury due to the illumination emblem as much as possible.

Although the present invention has been illustrated and described in connection with specific embodiments, it will be obvious to those of ordinary skill in the art that the present invention can be variously improved and changed within the scope of the technical spirit of the present invention provided by the following claims.

What is claimed is:

1. A driver airbag apparatus for vehicle with an illumination emblem, comprising:
   an airbag housing in which an airbag cushion and an inflator are installed;
   an airbag cover which is coupled to the airbag housing, and which includes a cover hole formed in a center thereof, a tear line formed in a circumferential direction around the cover hole, and a cover hinge part formed between first and second ends of the tear line;

an illumination emblem which is coupled to the airbag cover and positioned to be exposed through the cover hole;

a guide support configured to cover the cover hinge part at an inner position of the illumination emblem and configured to guide a deployment of the airbag cushion to prevent the airbag cushion from being deployed to the cover hinge part;

a cushion cover which covers the airbag cushion so as to maintain a folded state of the airbag cushion, wherein the guide support is installed to cover the cover hinge part by being coupled to the cushion cover.

2. The apparatus of claim 1, wherein the guide support is formed of either plastic or steel.

3. The apparatus of claim 1, wherein a width of the guide support in the left and right directions is greater than a width of the cover hinge part in the left and right directions, and smaller than a diameter of the airbag cover.

4. The apparatus of claim 1, wherein the guide support is inserted into the cushion cover and is coupled to the cushion cover by sewing.

5. The apparatus of claim 1, wherein a pocket is formed in a portion of the cushion cover that covers the cover hinge part; and the guide support is inserted into the pocket of the cushion cover and is coupled to the cushion cover by sewing.

6. The apparatus of claim 1, wherein the guide support is coupled to the cushion cover attached on one side of the cushion cover.

7. The apparatus of claim 1, wherein the guide support is coupled to one side of the cushion cover through an adhesive member.

8. The apparatus of claim 1, wherein the guide support is installed so that one side of the guide support is coupled to an inner surface of a wall part of the airbag cover through an adhesive member and another side of the guide support is supported on a bottom surface of the illumination emblem to cover the cover hinge part.

9. The apparatus of claim 1, wherein the guide support is installed so that one side of the guide support is coupled to a bottom surface of the illumination emblem through an adhesive member and another of the guide support is supported on an inner surface of a wall part of the airbag cover to cover the cover hinge part.

\* \* \* \* \*